(12) United States Patent
Nagata et al.

(10) Patent No.: US 10,239,417 B2
(45) Date of Patent: Mar. 26, 2019

(54) VEHICLE

(71) Applicant: Toyota Jidosha Kabushiki Kaisha, Toyota-shi, Aichi-ken (JP)

(72) Inventors: Shuichi Nagata, Toyota (JP); Keiichi Minamiura, Nagoya (JP); Takahiro Hirano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/723,520

(22) Filed: Oct. 3, 2017

(65) Prior Publication Data

US 2018/0099577 A1 Apr. 12, 2018

(30) Foreign Application Priority Data

Oct. 6, 2016 (JP) .................................. 2016-198163

(51) Int. Cl.
*B60L 11/18* (2006.01)
*H02J 7/00* (2006.01)
*B60L 8/00* (2006.01)
*H02J 7/35* (2006.01)

(52) U.S. Cl.
CPC ........... *B60L 11/1862* (2013.01); *B60L 8/003* (2013.01); *B60L 11/187* (2013.01); *B60L 11/1811* (2013.01); *H02J 7/0091* (2013.01); *H02J 7/35* (2013.01); *B60L 2210/10* (2013.01); *B60L 2240/545* (2013.01); *Y02T 10/7005* (2013.01); *Y02T 10/705* (2013.01); *Y02T 10/7044* (2013.01); *Y02T 10/7083* (2013.01); *Y02T 10/7216* (2013.01)

(58) Field of Classification Search
CPC ....................................................... H02J 7/0091
USPC ......................................................... 320/139
See application file for complete search history.

(56) References Cited

FOREIGN PATENT DOCUMENTS

JP 2008-290513 A 12/2008
JP 2015-126560 * 7/2015 ............... H02J 7/00

* cited by examiner

*Primary Examiner* — Edward Tso
*Assistant Examiner* — Ahmed H Omar
(74) *Attorney, Agent, or Firm* — Dinsmore & Shohl LLP (57) ABSTRACT

An electronic control unit performs a control routine including a step of setting SOC_u(1) as an upper limit value of an SOC and a step of setting SOC_l(1) as a lower limit value when a battery temperature TBs is higher than a first threshold value TBs(1) and a step of setting SOC_u(2) as the upper limit value and a step of setting SOC_l(2) as the lower limit value when the battery temperature TBs is lower than a second threshold value TBs(2).

3 Claims, 5 Drawing Sheets

VEHICLE

CROSS-REFERENCE TO RELATED APPLICATIONS

This application claims priority to Japanese Patent Application No. 2016-198163 filed on Oct. 6, 2016, which is incorporated herein by reference in its entirety.

BACKGROUND

1. Technical Field

The present disclosure relates to control of charging and discharging of a power storage device which is disposed in a vehicle.

2. Description of Related Art

In the related art, a vehicle in which a solar battery that converts light energy into electric power is mounted at a predetermined position such as a roof of the vehicle is known. In such a vehicle, a power storage device that supplies electric power to auxiliary machines and the like is charged with electric power output from the solar battery. On the other hand, charging using the solar battery may be limited to minimize overcharging of the power storage device or deterioration resulting therefrom depending on a temperature of the power storage device or a state of charge (which is also called as SOC) indicating a remaining capacity of the power storage device.

For example, Japanese Patent Application Publication No. 2008-290513 (JP 2008-290513 A) discloses a technique of prohibiting charging using a solar battery when a temperature or an SOC of a power storage device reaches a threshold value.

SUMMARY

However, when a threshold value of the temperature or a threshold value of the state of charge for prohibiting charging is set to be constant, there is a likelihood that electric power output from the solar battery will not be efficiently recovered. For example, charging using a solar battery is generally performed in the daytime in which the sun is up. At this time, when the power storage device is disposed in a vehicle interior, the temperature of the vehicle interior may increase greatly due to shining of solar light into the vehicle interior and the temperature of the power storage device may also increase. Accordingly, when the threshold value of the temperature of the power storage device for prohibiting charging is set to be constant, charging may not be performed even with a chargeable state of charge. Alternatively, when the threshold value of the state of charge for prohibiting charging is set to be constant, the threshold value of the state of charge may be set with a predetermined margin on the assumption of a high-temperature environment. This is for preventing gas from being generated in the power storage device due to a high temperature and a high state of charge of the power storage device to protect the power storage device. As a result, a state of charge range which is used in the power storage device is narrowed and a capacity for performing charging and discharging with a predetermined amount of electric power may not be secured in the power storage device.

The present disclosure is made to solve the above-mentioned problems and provides a vehicle that can secure a capacity for performing charging and discharging with a predetermined amount of electric power using a solar battery in a power storage device disposed in a vehicle interior while protecting the power storage device.

Therefore, according to an aspect of the present disclosure, there is provided a vehicle including a solar battery, a power storage device, and an electronic control unit. The solar battery is configured to convert light energy into electric power. The power storage device is disposed in a vehicle interior of the vehicle and the power storage device is configured to be charged using electric power output from the solar battery. The electronic control unit is configured to (i) control charging and discharging of the power storage device such that a state of charge of the power storage device is in a range between an upper limit value and a lower limit value, (ii) set a first upper limit value as the upper limit value when a temperature of the power storage device is equal to or lower than a first threshold value, and (iii) set a second upper limit value as the upper limit value when the temperature of the power storage device is higher than the first threshold value, the second upper limit value being less than the first upper limit value.

According to the above-mentioned vehicle, when the temperature of the power storage device disposed in the vehicle interior changes from a state lower than the first threshold value to a state higher than the first threshold value, it is possible to prevent the state of charge from increasing to a degree in which gas is generated in the power storage device at a high temperature by decreasing the upper limit value of the state of charge of the power storage device. Accordingly, it is possible to minimize an additional increase in temperature due to a chemical reaction in the power storage device. In this way, it is possible to use the power storage device in a wider range of the state of charge in comparison with a case in which the threshold value of the state of charge is set to be constant by decreasing the upper limit value of the state of charge only when the temperature of the power storage device is higher than the first threshold value.

In the vehicle, the electronic control unit may be configured to: (i) set a first lower limit value as the lower limit value when the temperature of the power storage device is equal to or lower than the first threshold value; and (ii) set a second lower limit value as the lower limit value when the temperature of the power storage device is higher than the first threshold value, the second lower limit value being less than the first lower limit value.

According to the above-mentioned vehicle, it is possible to prevent the state of charge range which is used in the power storage device from being narrowed by decreasing both the upper limit value and the lower limit value of the state of charge. When the temperature of the power storage device changes from a state higher than the first threshold value to a state lower than the first threshold value, it is possible to limit a voltage drop which is generated at the time of discharging with a low state of charge to within an allowable range by increasing the lower limit value of the state of charge of the power storage device. At this time, by increasing both the upper limit value and the lower limit value of the state of charge, it is possible to prevent the state of charge range which is used in the power storage device from being narrowed. Accordingly, it is possible to secure a capacity for performing charging and discharging in the power storage device regardless of the temperature of the power storage device.

In the vehicle, the electronic control unit may be configured to set a difference between the first upper limit value and the first lower limit value to be equal to a difference between the second upper limit value and the second lower limit value, such that a difference between the upper limit value and the lower limit value is constant.

According to the above-mentioned vehicle, it is possible to secure a capacity for performing charging and discharging with a predetermined amount of electric power in the power storage device regardless of the temperature of the power storage device.

In the vehicle, the electronic control unit may be configured to: (i) set a second threshold value which is less than the first threshold value; (ii) set a third upper limit value as the upper limit value and set a third lower limit value as the lower limit value when the temperature of the power storage device is lower than the second threshold value, the third upper limit value being greater than the first upper limit value, the third lower limit value being greater than the first lower limit value; and (iii) set the first upper limit value as the upper limit value and set the first lower limit value as the lower limit value when the temperature of the power storage device is equal to or higher than the second threshold value.

According to this configuration, when the temperature of the power storage device varies, both the upper limit value and the lower limit value of the state of charge of the power storage device can be gradually changed. Accordingly, it is possible to achieve protection of the power storage device by setting the upper limit value and the lower limit value of the state of charge of the power storage device to appropriate values based on the temperature of the power storage device.

In the vehicle, the electronic control unit may be configured to set a difference between the first upper limit value and the first lower limit value to be equal to a difference between the third upper limit value and the third lower limit value, such that a difference between the upper limit value and the lower limit value is constant.

According to the above-mentioned vehicle, it is possible to secure a capacity for performing charging and discharging with a predetermined amount of electric power in the power storage device regardless of the temperature of the power storage device.

According to the present disclosure, it is possible to provide a vehicle that can secure a capacity for performing charging and discharging with a predetermined amount of electric power using a solar battery in a power storage device disposed in a vehicle interior while protecting the power storage device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described in detail with reference to the accompanying drawings. In the drawings, identical or corresponding elements will be referenced by identical reference signs and description thereof will not be repeated.

In the following embodiment, an electric vehicle in which a motor generator is mounted as a drive source is exemplified as a vehicle, but the vehicle may be a hybrid vehicle in which an engine is additionally mounted as a drive source or a power source of a power generator or may be a vehicle including only an engine as a drive source instead of a motor generator.

Figure 1:
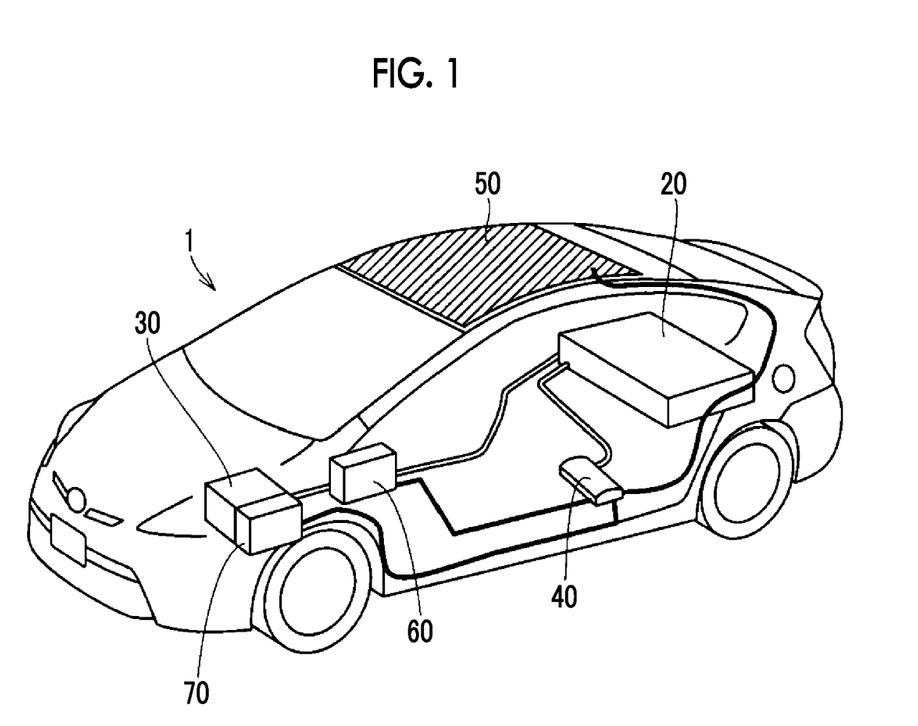
FIG. 1 is a diagram schematically illustrating a whole configuration of a vehicle according to an embodiment of the present disclosure.

FIG. 1 is a diagram schematically illustrating a whole configuration of a vehicle 1 according to this embodiment. As illustrated in FIG. 1, the vehicle 1 includes a battery pack 20, a power control unit (PCU) 30, a solar PCU 40, a solar panel 50, a solar battery 60, and an auxiliary machinery battery 70.

The battery pack 20 is a DC power supply which is rechargeable. The battery pack 20 includes a secondary battery such as a nickel hydride battery or a lithium ion battery. The battery pack 20 gives and receives electric power to and from a motor generator 6 (see FIG. 2, which is hereinafter referred to as an "MG 6") which is a drive source of the vehicle 1. The electric power of the battery pack 20 is supplied to the MG 6 via the PCU 30. The battery pack 20 is charged using electric power which is generated by the MG 6. The battery pack 20 may be charged using electric power supplied from an external power supply (not illustrated) outside the vehicle 1. The battery pack 20 is not limited to a secondary battery, and may include a device that can give and receive DC electric power to and from the MG 6, for example, a capacitor. For example, the battery pack 20 is disposed between wheel houses of right and left rear wheels below backseats of the vehicle 1.

The PCU 30 converts DC power of the battery pack 20 into AC power and supplies the AC power to the MG 6, or converts regenerative power (AC power) generated in the MG 6 into DC power and supplies the DC power to the battery pack 20.

The PCU 30 includes a converter and an inverter (both of which are not illustrated) including a plurality of switching elements. The converter or the inverter operates under ON/OFF control of the switching elements. The converter steps up a voltage of the DC power received from the battery pack 20 and outputs the stepped-up voltage to the inverter. The inverter converts the DC power output from the converter into AC power and outputs the AC power to the MG 6. Accordingly, the MG 6 is driven using electric power stored in the battery pack 20.

The inverter converts AC power generated by the MG 6 into DC power and outputs the DC power to the converter. The converter steps down a voltage of the DC power output from the inverter and outputs the stepped-down voltage to the battery pack 20. Accordingly, the battery pack 20 is charged using electric power generated by the MG 6. The converter may be omitted.

The PCU 30 further includes a DC/DC converter (not illustrated) that converts a voltage of the battery pack 20 into a voltage suitable for charging the auxiliary machinery battery 70. The DC/DC converter charges the auxiliary machinery battery 70 by supplying the converted power to the auxiliary machinery battery 70.

The solar panel 50 is a solar battery that converts light energy (for example, solar light energy) into DC power. In this embodiment, the solar panel 50 is installed on the surface of a roof of the vehicle 1 as illustrated in FIG. 1. Electric power generated in the solar panel 50 is supplied to the solar battery 60 via the solar PCU 40. The solar panel 50 may be disposed on a surface of a place (for example, a hood) other than the roof of the vehicle 1.

The solar battery 60 is a power storage device that stores electric power generated in the solar panel 50. The solar battery 60 has a configuration in which a plurality of (for example, three) cells or modules including a plurality of cells are connected in series. The solar battery 60 is disposed at a predetermined position (for example, a lower part of a center console) of the vehicle interior of the vehicle 1. The vehicle interior of the vehicle 1 includes a space (for example, a cabin) in the vehicle 1 in which an occupant rides and a space (for example, a trunk) communicating with the space.

Figure 2:
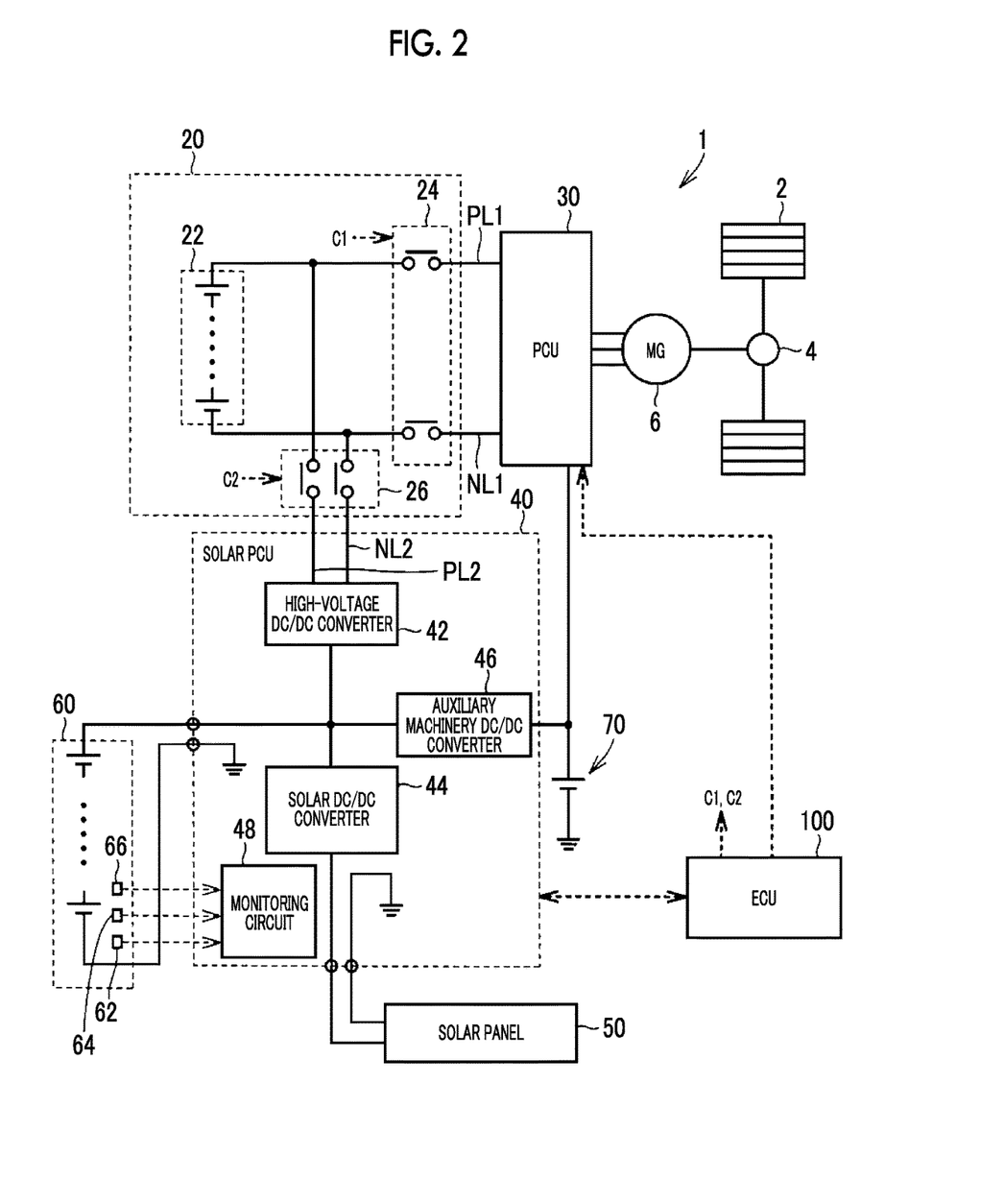
FIG. 2 is a block diagram illustrating a configuration of devices which are mounted in the vehicle according to the embodiment of the present disclosure.

The solar PCU 40 converts DC power output from the solar panel 50 into a voltage which can charge the solar battery 60 or converts DC power of the solar battery 60 into a voltage which can charge the battery pack 20 in accordance with a control signal from an electronic control unit (ECU) 100 (see FIG. 2). Specifically, for example, when the state of charge (hereinafter called as SOC) of the solar battery 60 increases to an upper limit value, the solar PCU 40 charges the battery pack 20 using electric power of the solar battery 60 or charges the auxiliary machinery battery 70. Alternatively, for example, when the SOC of the solar battery 60 decreases to a lower limit value, the solar PCU 40 charges the solar battery 60 using electric power output from the solar panel 50.

The auxiliary machinery battery 70 supplies electric power to an auxiliary load (not illustrated). Examples of the auxiliary load include electrical devices (for example, a car navigation system or an audio device) disposed in the vehicle interior of the vehicle 1 or various ECUs mounted in the vehicle 1.

Elements which are mounted in the vehicle 1 will be described below with reference to FIG. 2. FIG. 2 is a block diagram illustrating configurations of devices which are mounted in the vehicle 1 according to this embodiment. As illustrated in FIG. 2, the vehicle 1 further includes driving wheels 2, a power transmission gear 4, an MG 6, and an ECU 100.

The MG 6 is, for example, a three-phase AC rotary machine. An output torque of the MG 6 is transmitted to the driving wheels 2 via the power transmission gear 4 including a reduction gear. The MG 6 can also generate electric power by a rotational force of the driving wheels 2 at the time of a regenerative braking operation of the vehicle 1. A configuration in which only one motor generator as a drive source is disposed in the vehicle 1 illustrated in FIGS. 1 and 2 is exemplified, but the number of motor generators is not limited thereto and a configuration in which a plurality of (for example, two) motor generators are disposed may be employed.

The battery pack 20 includes an assembled battery 22, a system main relay (hereinafter referred to as an SMR) 24, and a charging relay (hereinafter referred to as a CHR) 26.

The assembled battery 22 has a configuration in which a plurality of modules including a plurality of cells are connected in series. Alternatively, the assembled battery 22 may have a configuration in which a plurality of cells are connected in series. The voltage of the assembled battery 22 is, for example, about 200 V.

The SMR 24 is disposed on power lines PL1 and NL1 that connect the PCU 30 and the assembled battery 22. The SMR 24 switches an electrical connection between the PCU 30 and the assembled battery 22 between a connected state (an ON state) and a cutoff state (an OFF state) based on a control signal C1 from the ECU 100.

The CHR 26 is disposed on power lines PL2 and NL2 that branch from the power lines PL1 and NL1 connecting the assembled battery 22 and the SMR 24 and are connected to the solar PCU 40. The CHR 26 switches an electrical connection between the power lines PL1 and NL1 and the solar PCU 40 between a connected state (an ON state) and a cutoff state (an OFF state) based on a control signal C2 from the ECU 100.

The solar PCU 40 includes a high-voltage DC/DC converter 42, a solar DC/DC converter 44, an auxiliary machinery DC/DC converter 46, and a monitoring circuit 48.

The high-voltage DC/DC converter 42 converts DC power of the solar battery 60 into DC power which can charge the assembled battery 22 based on a control signal from the ECU 100. The high-voltage DC/DC converter 42 supplies the converted electric power to the assembled battery 22.

The solar DC/DC converter 44 converts DC power supplied from the solar panel 50 into DC power which can charge the solar battery 60 based on a control signal from the ECU 100. The solar DC/DC converter 44 supplies the converted electric power to the solar battery 60.

The auxiliary machinery DC/DC converter 46 converts DC power of the solar battery 60 into DC power which can charge the auxiliary machinery battery 70 based on a control signal from the ECU 100. The auxiliary machinery DC/DC converter 46 supplies the converted electric power to the auxiliary machinery battery 70.

The monitoring circuit 48 monitors a state of the solar battery 60. The solar battery 60 is provided with a temperature sensor 62, a voltage sensor 64, and a current sensor 66. The temperature sensor 62 detects a temperature (hereinafter referred to as a battery temperature) TBs of the solar battery 60 and transmits a signal indicating the detected battery temperature TBs to the monitoring circuit 48. The voltage sensor 64 detects a whole voltage VBs of the solar battery 60 and transmits a signal indicating the detected voltage VBs to the monitoring circuit 48. The current sensor 66 detects a current IBs of the solar battery 60 and transmits a signal indicating the detected current IBs to the monitoring circuit 48.

The monitoring circuit 48 outputs information on the state of the solar battery 60 to the ECU 100. The monitoring circuit 48 outputs detection results received from the sensors to the ECU 100, or performs a predetermined calculation process on the detection results received from the sensors and outputs the calculation results to the ECU 100. Specifically, the monitoring circuit 48 calculates the SOC of the solar battery 60 based on the temperature TBs, the voltage VBs, and the current IBs of the solar battery 60 and outputs information indicating the calculated SOC to the ECU 100.

For example, the monitoring circuit 48 may estimate an open circuit voltage (OCV) based on the current IBs, the voltage VBs, and the battery temperature TBs of the solar battery 60, and may estimate the SOC of the solar battery 60 based on the estimated OCV and a predetermined map. Alternatively, the monitoring circuit 48 may estimate the SOC of the solar battery 60, for example, by integrating a charging current and a discharging current of the solar battery 60.

The ECU 100 includes a central processing unit (CPU), a memory which is a storage unit, and an input/output buffer, all of which are not illustrated. The ECU 100 controls various devices such that the vehicle 1 is in a desired operating state based on the signals from the sensors and the devices and maps and programs stored in the memory. A variety of controls are not limited to processing by software, and may be performed by dedicated hardware (an electronic circuit).

The ECU 100 acquires the SOC of the solar battery 60 from the monitoring circuit 48. The SOC calculating process which is performed by the monitoring circuit 48 may be performed by the ECU 100. When the SOC of the solar battery 60 reaches a lower limit value, the ECU 100 activates the solar DC/DC converter 44 and charges the solar battery 60 using electric power output from the solar panel 50.

When the SOC of the solar battery 60 reaches the upper limit value, the ECU 100 stops charging of the solar battery 60 and switches the CHR 26 to the ON state. The ECU 100 activates the high-voltage DC/DC converter 42 and charges the assembled battery 22 using electric power of the solar battery 60. The ECU 100 may activate the solar DC/DC converter 44 in addition to the high-voltage DC/DC converter 42 and charge the assembled battery 22. When the SOC of the solar battery 60 reaches the lower limit value or the SOC of the assembled battery 22 reaches an upper limit value, the ECU 10 stops the operation of the high-voltage DC/DC converter 42, switches the CHR 26 to the OFF state, and stops charging of the assembled battery 22.

The ECU 100 controls charging and discharging of the solar battery 60 such that the SOC of the solar battery 60 is within a range between the upper limit value and the lower limit value by activating the CHR 26 and the solar PCU 40 as described above.

In the vehicle 1 having the above-mentioned configuration, the solar battery 60 is charged with electric power output from the solar panel 50. On the other hand, charging using the solar panel 50 may be limited to minimize overcharging of the solar battery 60 or deterioration resulting therefrom depending on the battery temperature TBs of the solar battery 60 or the SOC of the solar battery 60. Specifically, it is conceivable that the charging using the solar panel 50 is prohibited when the battery temperature TBs or the SOC of the solar battery 60 reaches a threshold value (the upper limit value of the SOC).

However, when the threshold value of the temperature or the threshold value of the SOC for prohibiting charging is set to be constant, there is a likelihood that electric power output from the solar panel 50 will not be efficiently recovered. For example, charging using the solar panel 50 is generally performed in the daytime in which the sun is up. At this time, since the solar battery 60 is disposed in the vehicle interior of the vehicle 1, the temperature of the vehicle interior of the vehicle 1 may increase greatly due to shining of solar light into the vehicle interior and the temperature of the solar battery 60 may also increase.

Accordingly, when the threshold value of the temperature of the solar battery 60 for prohibiting charging is set to be constant, charging may not be performed even with a chargeable SOC. Alternatively, when the threshold value of the SOC for prohibiting charging is set to be constant, the threshold value of the SOC may be set with a predetermined margin on the assumption of a high-temperature environment. This is for preventing gas from being generated in the solar battery 60 due to a high temperature and a high SOC of the solar battery 60 to protect the power storage device. As a result, an SOC range which is used in the solar battery 60 is narrowed and a capacity for performing charging and discharging with a predetermined amount of electric power may not be secured in the solar battery 60.

Therefore, in this embodiment, when the battery temperature TBs of the solar battery 60 is lower than a first threshold value TBs(1), the ECU 100 sets an initial value SOC_u(0) as the upper limit value and sets an initial value SOC_l(0) as the lower limit value. When the battery temperature TBs of the solar battery 60 is higher than the first threshold value TBs(1), the ECU 100 sets SOC_u(1) which is less than the initial value SOC_u(0) as the upper limit value and sets SOC_l(1) which is less than the initial value SOC_l(0) as the lower limit value.

When the battery temperature TBs of the solar battery 60 is lower than a second threshold value TBs(2) (<TBs(1)), the ECU 100 sets SOC_u(2) which is greater than the initial value SOC_u(0) as the upper limit value and sets SOC_l(2) which is greater than the initial value SOC_l(0) as the lower limit value.

According to this configuration, when the battery temperature TBs increases, the upper limit value of the SOC of the solar battery 60 decreases and thus it is possible to prevent the SOC from increasing to an extent with which gas is generated in the solar battery 60 at a high temperature. When the battery temperature TBs decreases, the lower limit value of the SOC of the solar battery 60 increases and thus it is possible to prevent the voltage of the solar battery 60 from decreasing beyond an allowable range at a low SOC.

Figure 3:
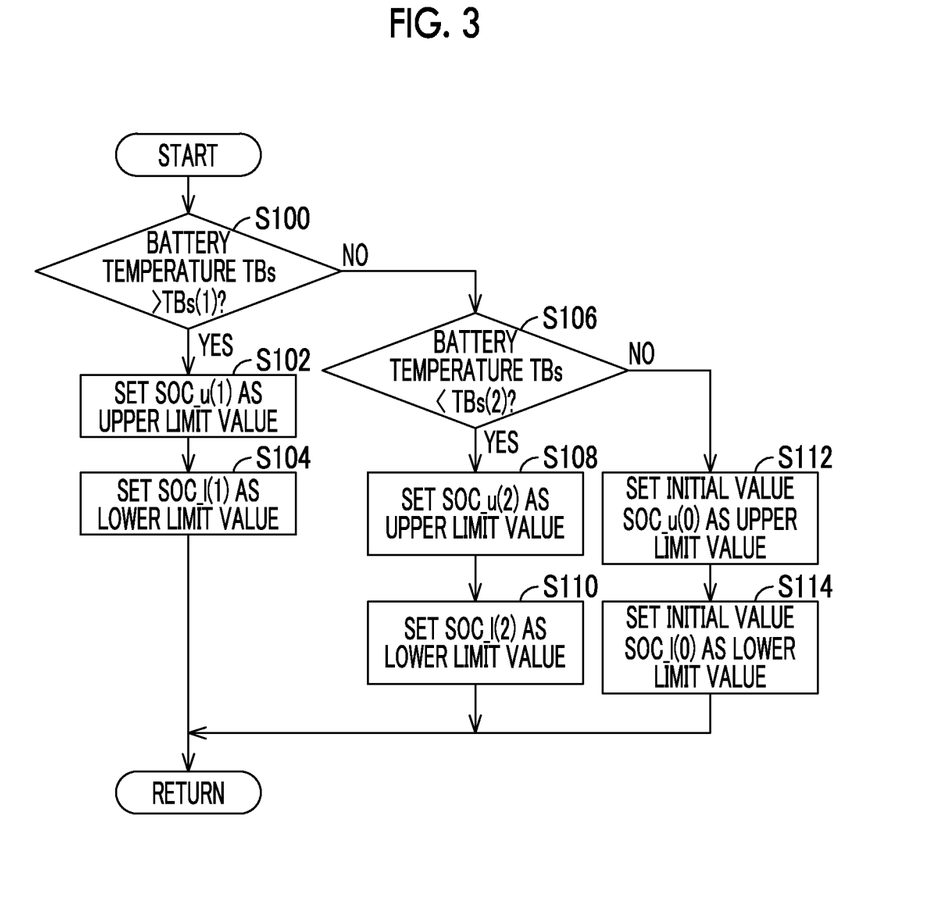
FIG. 3 is a flowchart illustrating a control routine which is performed by an ECU mounted in the vehicle according to the embodiment.

A control routine which is performed by the ECU 100 will be described below with reference to FIG. 3. FIG. 3 is a flowchart illustrating a control routine which is performed by the ECU 100 mounted in the vehicle 1 according to this embodiment.

In Step (hereinafter referred to as "S") 100, the ECU 100 determines whether the battery temperature TBs is higher than a first threshold value TBs(1). The first threshold value TBs(1) is a predetermined value and is a threshold value for determining whether the temperature of the solar battery 60 is higher than a room temperature range and is in a high temperature range requiring a decrease of the upper limit value of the SOC to protect the solar battery 60. When it is determined that the battery temperature TBs is higher than the first threshold value TBs(1) (YES in S100), the control routine transitions to S102.

In S102, the ECU 100 sets SOC_u(1) as the upper limit value of the SOC of the solar battery 60. SOC_u(1) is a value smaller than the initial value SOC_u(0). SOC_u(1) is determined by experiment or the like such that the SOC with which gas is not generated in the solar battery 60 is achieved in an environment in which the battery temperature TBs is higher than the first threshold value TBs(1).

In S104, the ECU 100 sets SOC_l(1) as the lower limit value of the SOC of the solar battery 60. SOC_l(1) is a value smaller than the initial value SOC_l(0). The magnitude of a difference between SOC_u(1) and SOC_l(1) is set to be equal to the magnitude of a difference between the initial value SOC_u(0) and the initial value SOC_l(0).

On the other hand, when it is determined that the battery temperature TBs is equal to or lower than the first threshold value TBs(1) (NO in S100), the control routine transitions to S106. In S106, the ECU 100 determines whether the battery temperature TBs is lower than a second threshold value TBs(2). The second threshold value TBs(2) is a value less than the first threshold value TBs(1). The second threshold value TBs(2) is a predetermined value and is a threshold value for determining whether the temperature of the solar battery 60 is lower than the room temperature range and is in a low temperature range requiring an increase of the lower limit value of the SOC to protect the solar battery 60. When it is determined that the battery temperature TBs is lower than the second threshold value TBs(2) (YES in S106), the control routine transitions to S108.

In S108, the ECU 100 sets SOC_u(2) as the upper limit value of the SOC of the solar battery 60. The magnitude of a difference between SOC_u(2) and SOC_l(2) is set to be equal to the magnitude of the difference between the initial value SOC_u(0) and the initial value SOC_l(0).

In S110, the ECU 100 sets SOC_l(2) as the lower limit value of the SOC of the solar battery 60. SOC_l(2) is determined by experiment or the like such that a voltage drop at a low SOC is in an allowable range.

When it is determined that the battery temperature TBs is equal to or higher than the second threshold value TBs(2) (NO in S106), the control routine transitions to S112.

In S112, the ECU 100 sets the initial value SOC_u(0) as the upper limit value of the SOC of the solar battery 60. In S114, the ECU 100 sets the initial value SOC_l(0) as the lower limit value of the SOC of the solar battery 60. The initial value SOC_u(0) and the initial value SOC_l(0) are determined by experiment or the like, for example, such that a capacity for performing charging and discharging with a predetermined amount of electric power using the solar panel 50 can be secured in the room temperature range.

Figure 4:
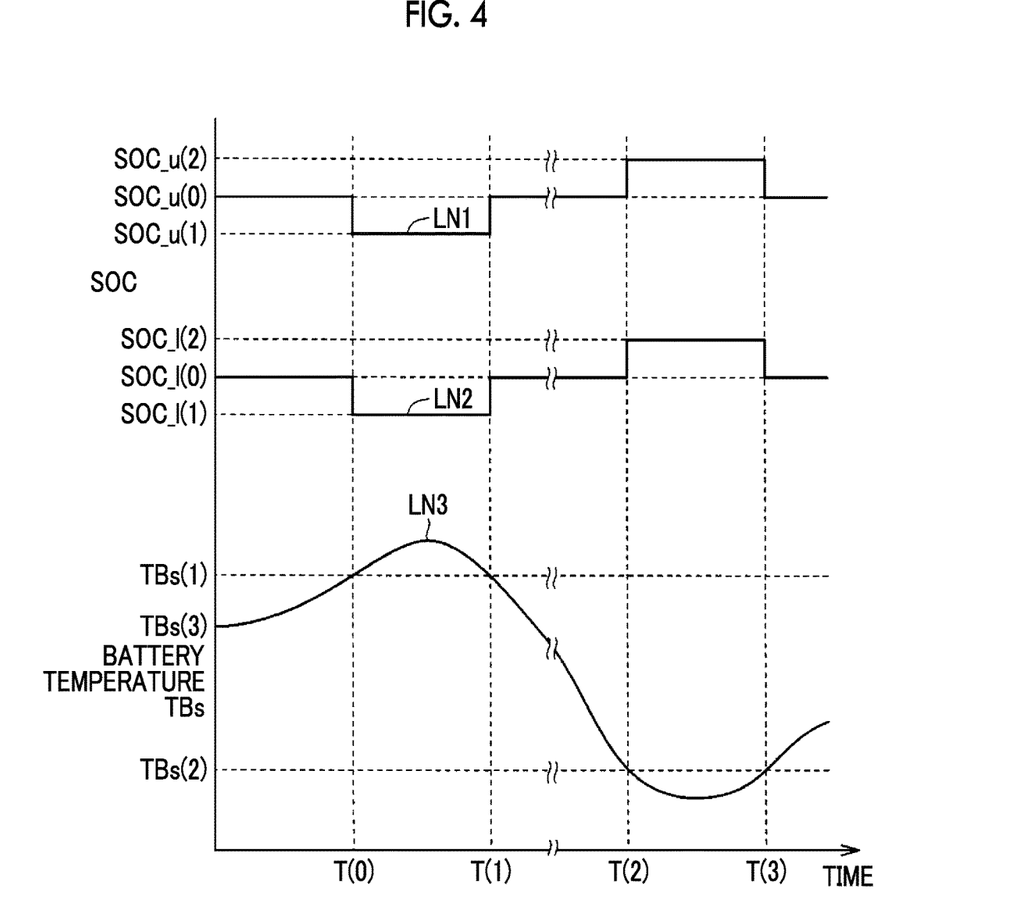
FIG. 4 is a timing chart illustrating operations of the ECU mounted in the vehicle according to the embodiment.

The operation of the vehicle 1 according to this embodiment based on the above-mentioned structure and flowchart will be described below with reference to FIG. 4. FIG. 4 is a timing chart illustrating the operation of the ECU 100 mounted in the vehicle 1 according to this embodiment. The horizontal axis in FIG. 4 represents time, and the vertical axis in FIG. 4 represents change of the upper limit value and the lower limit value of the SOC and the battery temperature TBs. LN1 in FIG. 4 denotes change of the upper limit value of the SOC of the solar battery 60. LN2 in FIG. 4 denotes change of the lower limit value, of the SOC of the solar battery 60. LN3 in FIG. 4 denotes change of the battery temperature TBs. As illustrated in FIG. 4, an example in which the battery temperature TBs changes greatly over the temperature range between the first threshold value TBs(1) and the second threshold value TBs(2) will be described.

For example, it is assumed that the current battery temperature TBs is a third threshold value TBs(3). At this time, as denoted by LN1 in FIG. 4, since the battery temperature TBs is equal to or lower than the first threshold value TBs(1) (NO in S100) and is equal to or higher than the second threshold value TBs(2) (NO in S106), the initial value SOC_u(0) is set as the upper limit value of the SOC of the solar battery 60 (S112) and the initial value SOC_l(0) is set as the lower limit value of the SOC of the solar battery 60 (S114).

Accordingly, charging and discharging of the solar battery 60 are controlled such that the SOC of the solar battery 60 is within a range between the upper limit value SOC_u(0) and the lower limit value SOC_l(0).

For example, during parking in the daytime in summer, since solar light shines into the vehicle interior of the vehicle 1, the temperature of the vehicle interior may increase greatly. In this case, the temperature around the solar battery 60 also increases with the increase of the temperature of the vehicle interior and the battery temperature TBs also increases.

At time T(0), when the battery temperature TBs is higher than the first threshold value TBs(1) (YES in S100), SOC_u(1) is set as the upper limit value of the SOC of the solar battery 60 (S102) and SOC_l(1) is set as the lower limit value of the SOC of the solar battery 60 (S104).

Accordingly, charging and discharging of the solar battery 60 are controlled such that the SOC of the solar battery 60 is within a range between the upper limit value SOC_u(1) and the lower limit value SOC_l(1). By decreasing the upper limit value of the SOC of the solar battery 60, generation of gas in the solar battery 60 is prevented even when the SOC increases to the vicinity of the upper limit value at a high temperature. Accordingly, it is possible to prevent the temperature of the solar battery 60 from increasing due to a chemical reaction. Since the upper limit value and the lower limit value of the SOC of the solar battery 60 decrease together and the difference between the upper limit value and the lower limit value can be set to be constant, it is possible to secure a capacity for performing charging and discharging with a predetermined amount of electric power regardless of the battery temperature TBs. Since the temperature of the solar battery 60 is in a high temperature range higher than the first threshold value TBs(1), a voltage drop at a low SOC is limited to an allowable range even when the lower limit value of the solar battery 60 decreases.

When an amount of solar light shining into the vehicle interior decreases or the like and the temperature of the vehicle interior decreases, the battery temperature TBs also decreases.

At time T(1), when the battery temperature TBs is equal to or lower than the first threshold value TBs(1) (NO in S100) and is equal to or higher than the second threshold value TBs(2) (NO in S106), the initial value SOC_u(0) is set as the upper limit value of the SOC of the solar battery 60 (S112) and the initial value SOC_l(0) is set as the lower limit value of the SOC of the solar battery 60 (S114).

On the other hand, for example, during parking in winter or the like, the temperature of the vehicle interior may decrease greatly. In this case, the battery temperature TBs decreases with the decrease of the temperature of the vehicle interior.

At time T(2), when the battery temperature is equal to or lower than the first threshold value TBs(1) (NO in S100) and is lower than the second threshold value TBs(2) (YES in S106), SOC_u(2) is set as the upper limit value of the SOC of the solar battery 60 (S108) and SOC_l(2) is set as the lower limit value of the SOC of the solar battery 60 (S110).

Accordingly, charging and discharging of the solar battery 60 are controlled such that the SOC of the solar battery 60 is within a range between the upper limit value SOC_u(2) and the lower limit value SOC_l(2). By increasing the lower limit value of the SOC of the solar battery 60, a voltage drop is prevented from exceeding an allowable range even when the SOC decreases to the vicinity of the lower limit value at a low temperature. Since the upper limit value of the SOC of the solar battery 60 along with the lower limit value increase together and the difference between the upper limit value and the lower limit value can be set to be constant, it is possible to secure a capacity for performing charging and discharging with a predetermined amount of electric power regardless of the battery temperature TBs.

Thereafter, the battery temperature TBs increases with the increase of the temperature of the vehicle interior, and when the battery temperature TBs is equal to or higher than the second threshold value TBs(2) at time T(3) (NO in S106), the initial value SOC_u(0) is set as the upper limit value of the SOC of the solar battery 60 (S112) and the initial value SOC_l(0) is set as the lower limit value of the SOC of the solar battery 60 (S114).

In this way, according to the vehicle of this embodiment, when the battery temperature TBs increases, it is possible to prevent the SOC from increasing to an extent in which gas is generated in the solar battery 60 at a high temperature by decreasing the upper limit value of the SOC of the solar battery 60. Accordingly, it is possible to minimize an additional increase in temperature due to a chemical reaction in the solar battery 60. By decreasing both the upper limit value and the lower limit value of the SOC, it is possible to prevent the range of the SOC which is used in the solar battery 60 from being narrowed. When the battery temperature TBs decreases, it is possible to increase the lower limit value of the SOC of the solar battery 60. Accordingly, it is possible to limit a voltage drop, which is caused at the time of discharging at a low SOC, to an allowable range. By increasing both the upper limit value and the lower limit value of the SOC, it is possible to prevent the range of the SOC which is used in the solar battery 60 from being narrowed. Accordingly, it is possible to secure a capacity for performing charging and discharging with a predetermined amount of electric power in the solar battery 60 regardless of the battery temperature TBs. Since an increase in the number of times of switching of charging and discharging can be minimized, it is possible to minimize deterioration in a lifespan or durability of the solar battery 60 or devices (for example, the CHR 26) which operate in association with charging an discharging of the solar battery 60. Accordingly, it is possible to provide a vehicle that can secure a capacity for performing charging and discharging with a predetermined amount of electric power using a solar battery in a power storage device disposed in a vehicle interior of the vehicle while protecting the power storage device.

By setting two threshold values of the battery temperature TBs for changing the upper limit value and the lower limit value of the SOC, the upper limit value and the lower limit value of the SOC of the solar battery 60 can be changed in two steps depending on the battery temperature TBs. Accordingly, it is possible to set the upper limit value and the lower limit value of the SOC of the solar battery 60 to appropriate values depending on the battery temperature TBs.

Before and after the SOC of the solar battery 60 is changed, the difference between the upper limit value and the lower limit value can be set to be constant. Accordingly, it is possible to perform charging and discharging with a predetermined amount of electric power in the solar battery 60 regardless of the battery temperature TBs.

Modified examples of this embodiment will be described below. In the above-mentioned embodiment, both the upper limit value and the lower limit value of the SOC of the solar battery 60 are changed depending on the battery temperature TBs, but for example, only the upper limit value of the SOC of the solar battery 60 may be changed depending on the battery temperature TBs.

Figure 5:
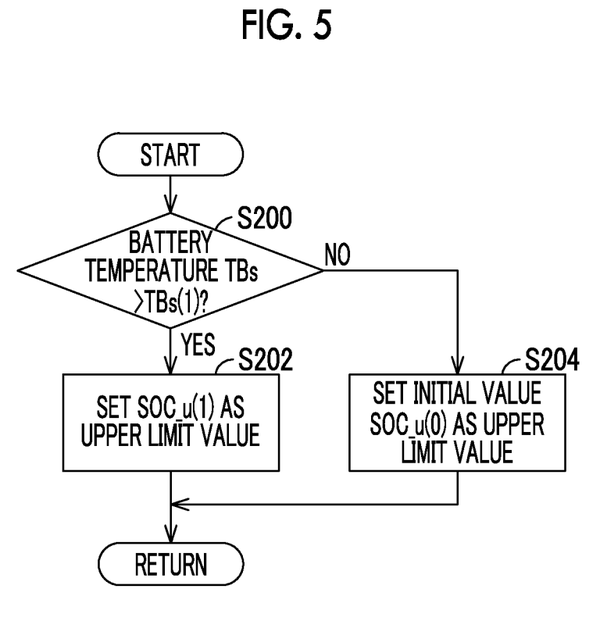
FIG. 5 is a flowchart illustrating a control routine which is performed by an ECU mounted in a vehicle according to a modified example of the embodiment.

A control routine which is performed by the ECU 100 mounted in a vehicle according to a modified example will be described below with reference to FIG. 5. FIG. 5 is a flowchart illustrating a control routine which is performed by the ECU 100 mounted in the vehicle according to the modified example.

In S200, the ECU 100 determines whether the battery temperature TBs is higher than the first threshold value TBs(1). The first threshold value TBs(1) is the same as described above and thus detailed description thereof will not be repeated. When it is determined that the battery temperature TBs is higher than the first threshold value TBs(1) (YES in S200), the control routine transitions to S202.

In S202, the ECU 100 sets SOC_u(1) as the upper limit value of the SOC of the solar battery 60. In S204, the ECU 100 sets the initial value SOC_u(0) as the upper limit value of the SOC of the solar battery 60.

SOC_u(0) and SOC_u(1) are the same as described above and thus detailed description thereof will not be repeated.

According to this configuration, when the battery temperature TBs increases, it is possible to prevent the SOC from increasing to an extent in which gas is generated in the solar battery 60 at a high temperature by decreasing the upper limit value of the SOC of the solar battery 60. Accordingly, it is possible to minimize an additional increase in temperature due to a chemical reaction in the solar battery 60. In this way, it is possible to use the solar battery 60 in a wider range of the SOC in comparison with a case in which the threshold value of the SOC is set to be constant by decreasing the upper limit value of the SOC of the solar battery 60 only when the battery temperature TBs is higher than the first threshold value TBs(1). By setting a plurality of threshold values for decreasing the upper limit value of the SOC, the upper limit value of the SOC may be decreased stepwise or continuously.

In the above-mentioned embodiment, the upper limit value and the lower limit value of the SOC are changed in two steps depending on the battery temperature TBs by two threshold values of the battery temperature TBs, but the upper limit value and the lower limit value of the SOC may be changed in three or more steps depending on the battery temperature TBs by setting three or more threshold values of the battery temperature TBs, or the upper limit value and the lower limit value of the SOC may be continuously changed with the change of the battery temperature TBs.

According to this configuration, it is possible to set the upper limit value and the lower limit value of the SOC of the solar battery 60 to appropriate values depending on the battery temperature TBs.

In the above-mentioned embodiment, the upper limit value and the lower limit value of the SOC are changed depending on the battery temperature TBs which is detected using the temperature sensor 62, but the battery temperature TBs may be estimated based on the temperature of the vehicle interior of the vehicle 1 and the upper limit value and the lower limit value of the SOC may be changed depending on the estimated battery temperature TBs. Alternatively, the battery temperature TBs may be estimated based on the temperature around the solar battery 60 (an ambient temperature) and the upper limit value and the lower limit value of the SOC may be changed depending on the estimated battery temperature TBs. Alternatively, the battery temperature TBs may be estimated based on an outside air temperature and the upper limit value and the lower limit value of the SOC may be changed depending on the estimated battery temperature TBs.

In the above-mentioned embodiment, the upper limit value and the lower limit value of the SOC of the solar battery 60 disposed in the vehicle interior of the vehicle 1 are set depending on the battery temperature TBs, but setting of the upper limit value and the lower limit value of the SOC depending on the battery temperature TBs has only to be applied to at least a power storage device which is disposed in the vehicle interior of the vehicle 1 in which a range of change in temperature is large and is not limited particularly to the solar battery 60. For example, when the assembled battery 22 is disposed in the vehicle interior of the vehicle 1, the upper limit value and the lower limit value of the SOC of the assembled battery 22 may be set depending on the temperature of the assembled battery 22 instead of or in addition to the solar battery 60.

In the above-mentioned embodiment, the temperature sensor 62 is disposed at only one position in the solar battery 60, but the temperature sensor 62 may be disposed at a plurality of positions in the solar battery 60. The temperature sensor 62 may be disposed, for example, in each cell of the solar battery 60 or may be disposed every predetermined number of cells or at predetermined distance intervals in the solar battery 60. In this case, the ECU 100 may detect a highest value among the detection results of the plurality of temperature sensors as the battery temperature TBs or may detect an average value of the detection results of the temperature sensors as the battery temperature TBs.

In the above-mentioned embodiment, the upper limit value and the lower limit value of the SOC of the solar battery 60 are set depending on the battery temperature TBs, but when the solar battery 60 is a nickel-hydride battery, it may be difficult for the temperature to decrease even if charging is stopped because the SOC reaches the upper limit value at a high temperature. This is because oxygen gas generated by charging immediately before stopping emits heat by a recombination reaction. Accordingly, control of discharging the solar battery 60 until a predetermined time elapses in the SOC range which has been changed at a predetermined timing may be performed as well as setting the upper limit value and the lower limit value of the SOC of the solar battery 60 depending on the battery temperature TBs. The predetermined timing refers to a state in which charging using the solar panel 50 is possible such as a timing at which the system of the vehicle 1 stops and examples thereof include a timing at which operation of an air-conditioning device in the vehicle interior of the vehicle 1 or a cooling device for cooling the power storage device disposed in the vehicle interior stops and a timing at which charging of the solar battery 60 stops because the temperature of the solar battery 60 reaches an upper limit.

According to this configuration, when the system of the vehicle 1 stops or when charging of the solar battery 60 in a high-temperature state stops, it is possible to reduce an amount of gas in the solar battery 60 by performing discharging until a predetermined time elapses. Accordingly, it is possible to decrease the temperature of the solar battery 60.

All or a part of the above-mentioned modified examples may be appropriately combined for practice. The above-mentioned embodiment or the modified examples thereof should be regarded to be exemplary in all regards, not restrictive. The scope of the disclosure is defined by the appended claims, not by the above-mentioned description, and is intended to include all modifications within meanings and scopes equivalent to the claims.

What is claimed is:

1. A vehicle comprising:
a solar battery configured to convert light energy into electric power;
a power storage device disposed in a vehicle interior of the vehicle, the power storage device being configured to be charged using the electric power output from the solar battery; and
an electronic control unit configured to:
(i) control charging and discharging of the power storage device such that a state of charge of the power storage device is in a range between an upper limit value and a lower limit value,
(ii) set a first upper limit value as the upper limit value when a temperature of the power storage device is equal to or lower than a first threshold value,
(iii) set a second upper limit value as the upper limit value when the temperature of the power storage device is higher than the first threshold value, the second upper limit value being less than the first upper limit value,
(iv) set a first lower limit value as the lower limit value when the temperature of the power storage device is equal to or lower than the first threshold value,
(v) set a second lower limit value as the lower limit value when the temperature of the power storage device is higher than the first threshold value, the second lower limit value being less than the first lower limit value,
(vi) set a second threshold value which is less than the first threshold value,
(vii) set a third upper limit value as the upper limit value and set a third lower limit value as the lower limit value when the temperature of the power storage device is lower than the second threshold value, the third upper limit value being greater than the first upper limit value, the third lower limit value being greater than the first lower limit value, and
(viii) set the first upper limit value as the upper limit value and set the first lower limit value as the lower limit value when the temperature of the power storage device is equal to or higher than the second threshold value.

2. The vehicle according to claim 1, wherein
the electronic control unit is configured to set a difference between the first upper limit value and the first lower limit value to be equal to a difference between the second upper limit value and the second lower limit value, such that a difference between the upper limit value and the lower limit value is constant.

3. The vehicle according to claim 1, wherein
the electronic control unit is configured to set a difference between the first upper limit value and the first lower limit value to be equal to a difference between the third upper limit value and the third lower limit value, such that a difference between the upper limit value and the lower limit value is constant.

* * * * *